(12) United States Patent
Garcia-Saavedra et al.

(10) Patent No.: US 11,019,534 B2
(45) Date of Patent: May 25, 2021

(54) MULTI-CONNECTIVITY SCHEDULER FOR A MULTI-RAT SYSTEM

(71) Applicant: NEC Laboratories Europe GmbH, Heidelberg (DE)

(72) Inventors: Andres Garcia-Saavedra, Heidelberg (DE); Luis Diez Fernandez, Santander (ES); Ramon Agueero, Santander (ES); Xi Li, Heidelberg (DE); Xavier Costa Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/490,918

(22) PCT Filed: Mar. 27, 2018

(86) PCT No.: PCT/EP2018/057818
§ 371 (c)(1),
(2) Date: Sep. 4, 2019

(87) PCT Pub. No.: WO2018/178100
PCT Pub. Date: Oct. 4, 2018

(65) Prior Publication Data
US 2019/0394681 A1    Dec. 26, 2019

(30) Foreign Application Priority Data

Mar. 28, 2017 (EP) .................... 17163397

(51) Int. Cl.
*H04W 28/16* (2009.01)
*H04L 5/00* (2006.01)
*H04W 88/12* (2009.01)

(52) U.S. Cl.
CPC .......... *H04W 28/16* (2013.01); *H04L 5/0007* (2013.01); *H04W 88/12* (2013.01)

(58) Field of Classification Search
CPC . H04W 28/16; H04W 88/12; H04W 28/0278; H04W 72/1215; H04L 5/0007;
(Continued)

(56) References Cited

U.S. PATENT DOCUMENTS

| 2011/0164532 | A1* | 7/2011 | Kawamura | ......... H04L 27/0008 370/254 |
| 2014/0161054 | A1* | 6/2014 | Sandberg | ............... H04B 7/024 370/329 |
| 2014/0321376 | A1* | 10/2014 | Damnjanovic | ... H04W 72/1215 370/329 |
| 2015/0341148 | A1* | 11/2015 | Kazmi | .................. H04L 5/0098 370/252 |

(Continued)

FOREIGN PATENT DOCUMENTS

WO     WO 2013100827 A1    7/2013

OTHER PUBLICATIONS

Shajaiah, Haya et al. "An Efficient Multi-carrier Resource Allocation with User Discrimination Framework for 5G Wireless Systems," International Journal of Wireless Information Networks, Plenum Press, New York, NY, US, vol. 22, No. 4, Sep. 14, 2015, pp. 345-356, XP035911542.

(Continued)

*Primary Examiner* — Hassan Kizou
*Assistant Examiner* — Abdullahi Ahmed
(74) *Attorney, Agent, or Firm* — Leydig, Voit & Mayer, Ltd.

(57) ABSTRACT

A method for managing radio resources in a multiple radio access technology (multi-RAT) wireless communication network, which includes one or more orthogonal frequency-division multiple access (OFDMA)-based base stations that implement different radio access technologies (RATs), includes the step of creating, for each of a plurality of mobile terminals, an incoming queue where data destined to the respective mobile terminal is buffered. Queue information of each mobile terminal is collected and provided to the multi-RAT wireless communication network. System con- (Continued)

straints of the multi-RAT wireless communication network are defined and network constraint information is provided. Based on the queue information and the network constraint information, a resource scheduling algorithm is executed that jointly determines: an allocation of physical resource blocks (PRBs) to each link between a RAT and a mobile terminal, an assignment of modulation levels to each of the allocated PRBs, and an activation/deactivation of each of the RATs.

18 Claims, 7 Drawing Sheets

(58) Field of Classification Search
CPC ... H04L 5/0082; H04L 5/0058; H04L 5/0037; Y02D 30/70
See application file for complete search history.

(56) References Cited

U.S. PATENT DOCUMENTS

| | | | |
|---|---|---|---|
| 2016/0270037 A1* | 9/2016 | Ji | H04W 72/1273 |
| 2017/0078890 A1 | 3/2017 | Zhu et al. | |
| 2017/0188352 A1* | 6/2017 | Lee | H04L 5/0044 |
| 2017/0290021 A1* | 10/2017 | Choi | H04W 88/10 |
| 2020/0007270 A1* | 1/2020 | Wikstrom | H04W 72/0413 |
| 2020/0059821 A1* | 2/2020 | Wirth | H04L 5/0094 |

OTHER PUBLICATIONS

Al-Amri, Ahmed et al. "Hybrid Frequency-Time Domain Proportional Fair Resource Allocation Scheme for LTE Downlink," Networks (ICON), 2012 18th IEEE International Conference on, IEEE, Dec. 12, 2012, pp. 286-290, XP032376793.

Brown, Gabriel, "Exploring 5G New Radio: Use Cases, Capabilities & Timeline," Qualcomm, White Paper, Sep. 2016.

* cited by examiner

MULTI-CONNECTIVITY SCHEDULER FOR A MULTI-RAT SYSTEM

CROSS-REFERENCE TO PRIOR APPLICATIONS

This application is a U.S. National Phase Application under 35 U.S.C. § 371 of International Application No. PCT/EP2018/057818, filed on Mar. 27, 2018, and claims benefit to European Patent Application No. EP 17163397.7, filed on Mar. 28, 2017. The International Application was published in English on Oct. 4, 2018, as WO 2018/178100 under PCT Article 21(2).

FIELD

The present invention relates to a controller and a method for a flexible and adaptive control of radio resources in a multi-RAT (Radio Access Technology) wireless communication network including one or more OFDMA-based (Orthogonal Frequency-Division Multiple Access) base stations that implement different RATs.

BACKGROUND

Network densification is well-recognized as a key means to take on the challenge of supporting a thousand-fold increase in traffic demand in the next generation of mobile systems. In turn, network densification involves both spatial densification, i.e. packing more radio access points per unit area, and spectrum densification, i.e. aggregating potentially non-contiguous radio bands.

For example, a cost-efficient way of accomplishing spatial densification is to deploy an "army" of low-power low-cost radio access technologies (RATs), such as small-cells. FIG. 1 schematically illustrates a number of different deployment scenarios of such small-cells, relevant for 5G and beyond. The advantages of this approach are well known, namely (i) the distance between users and RATs is shortened, thus increasing the quality of the wireless links; and (ii) (small) RATs can implement more aggressive energy-saving features, lowering the operational costs of the infrastructure.

On the downside, however, the load that each individual RAT has to manage becomes highly volatile and unpredictable. In this context, it is important to note that user traffic is highly variable, as evidenced in a plethora of literature, e.g. in Abdelhadi et al. (A. Abdelhadi and C. Clancy, *An Optimal Resource Allocation with Joint Carrier Aggregation in 4G-LTE*, International Conference on Computing, Networking and Communications (ICNC), 2015) or in Shajaiah et al. (H. Shajaiah, A. Abdel-Hadi and C. Clancy, *An Efficient Multi-carrier Resource Allocation with User Discrimination Framework for 5G Wireless Systems*, International Journal of Wireless Information Networks, vol. 22, no. 4, pp. 345-356, 2015), but macro-cells compensate this volatility by aggregating multiple flows. This leverage fades in dense contexts because individual (low-power) RATs handle fewer flows, as described in Yu et al. (G. Yu, Q. Chen, R. Yin, H. Zhang and G. Y. Li, *Joint Downlink and Uplink Resource Allocation for Energy-Efficient Carrier Aggregation*, IEEE Transactions on Wireless Communications, vol. 14, no. 6, pp. 3207-3218, 2015).

SUMMARY

In an embodiment, the present invention provides a method for managing radio resources in a multiple radio access technology (multi-RAT) wireless communication network including one or more orthogonal frequency-division multiple access (OFDMA)-based base stations that implement different radio access technologies (RATs). The method includes the step of creating, for each of a plurality of mobile terminals, an incoming queue where data destined to the respective mobile terminal is buffered. Queue information of each of the mobile terminals is collected and provided to the multi-RAT wireless communication network. System constraints of the multi-RAT wireless communication network are defined and network constraint information is provided. Based on the queue information and the network constraint information, a resource scheduling algorithm is executed that jointly determines: an allocation of physical resource blocks (PRBs) to each link between one of the RATs and one of the mobile terminals, an assignment of modulation levels to each of the allocated PRBs, and an activation/deactivation of each of the RATs.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
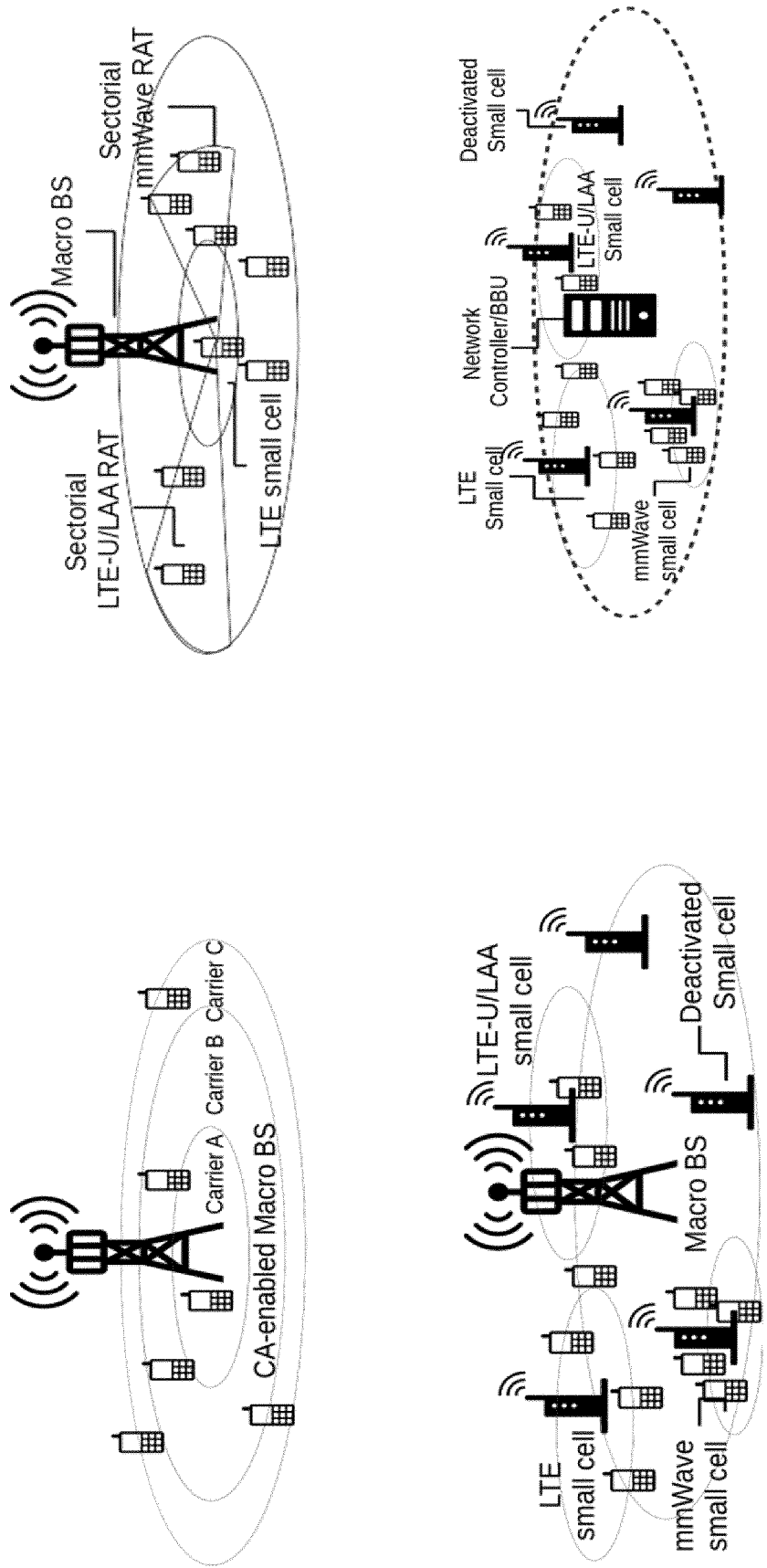
FIG. 1 is a schematic view illustrating various deployments relevant for 5G and beyond in which methods in accordance with embodiments of the present invention can be suitably applied.

In view of the above discussion, embodiments of the present invention recognize that a cost-efficient dense deployment requires a flexible and adaptive control of radio resources.

For instance, a network operator may want to distribute low-power load across fewer RATs and/or use only inexpensive unlicensed bands as long as the demand is satisfied in order to save costs and cause low interference. However, when the load increases, the network controller needs to adapt very quickly (e.g. activating RATs to offload traffic during peak hours).

Regarding spectrum densification, multi-connectivity between single users and multiple RATs is attracting a lot of interest to 5G RAN architects, who are in the hunt for larger chunks of spectrum. With multi-connectivity, it is possible to extend the amount of bandwidth by simply aggregating non-contiguous frequency bands, e.g., sub-6 GHz, ISM bands, mmWave or TV white spaces (see FIG. 1), possibly unified under a common OFDM-based air interface, namely 3GPP New Radio (NR), as described by Qualcomm, *Exploring 5G New Radio: Use Cases. Capabilities & Timeline*, White Paper, 2016.

As a consequence of the above, radio resource scheduling becomes substantially more complex. For instance, unlicensed LTE (LTE-U/LTE-LAA) operates in the 5 GHz ISM band, subject to uncontrolled interference from external users (i.e., available bandwidth in this band is thus variable and uncertain), whereas the bandwidth of licensed LTE RATs is more deterministic. Another example: mmWave provides wider channels but signal strength degrades rapidly with distance or obstructing objects; conversely, lower frequencies offer more consistent and larger coverage.

In an embodiment, the present invention provides a method for managing radio resources in a multi-RAT wireless communication network including one or more OFDMA-based base stations that implement different RATs. The method includes creating for each of a plurality of mobile terminals an incoming queue where data destined to the respective mobile terminal is buffered; collecting queue information of each mobile terminal and providing the queue information to the multi-RAT wireless communication network; and defining system constraints of the multi-RAT wireless communication network and providing network constraint information. Based on the queue information and the network constraint information, executing a resource scheduling algorithm that jointly decides on the allocation of PRBs, Physical Resource Blocks, to each of the links between a RAT and a mobile terminal, on the assignment of modulation levels to each of the allocated PRBs, and on the activation/deactivation of each RAT.

According to an embodiment the queue information and the network constraint information are provided to a scheduling component that, based on this information, executes the resource scheduling algorithm. The scheduling component may be implemented as a functional entity of a network controller of the multi-RAT wireless communication network.

Embodiments of the present invention relate to a practical multi-connectivity scheduler for OFDMA-based (Orthogonal Frequency-Division Multiple Access) multi-RAT heterogeneous systems that is general enough to function optimally in a variety of uplink and downlink scenarios, as illustrated in FIG. 1, including simple macro-cell scenarios (with both single RAT or multiple co-located RATs) or more complex structures based on distributed RATs, e.g., C-RAN (Cloud Radio Access Network) or HetNet (Heterogeneous Networks) architectures. Yet, according to embodiments of the invention the scheduler does not take assumptions on the stochastic properties of the system (including arrival of data, mobility, etc.), nor does it make simplifications on the constraints of the underlying system (e.g., discrete sets of modulations and PRBs (Physical Resource Blocks), signaling overhead, imperfect—noisy or delayed—backlog information, etc.), and it is robust to non-stationarities.

In marked contrast, the existing prior art schedulers focus on specific setups, making strong simplifications that limit their applicability in real systems, and can hardly be extrapolated to general cases. Additional key differences between the present invention and prior art solutions is that embodiments of the invention support heterogeneous RATs OFDMA-based (which is in line with 5G New Radio) and that three decisions are taken in an online fashion: 1) decide on the number of PRBs per RAT and user, 2) decide on the modulation level of those PRBs, and 3) decide which RATs should be awaken or sent to "sleep" mode.

Figure 2:
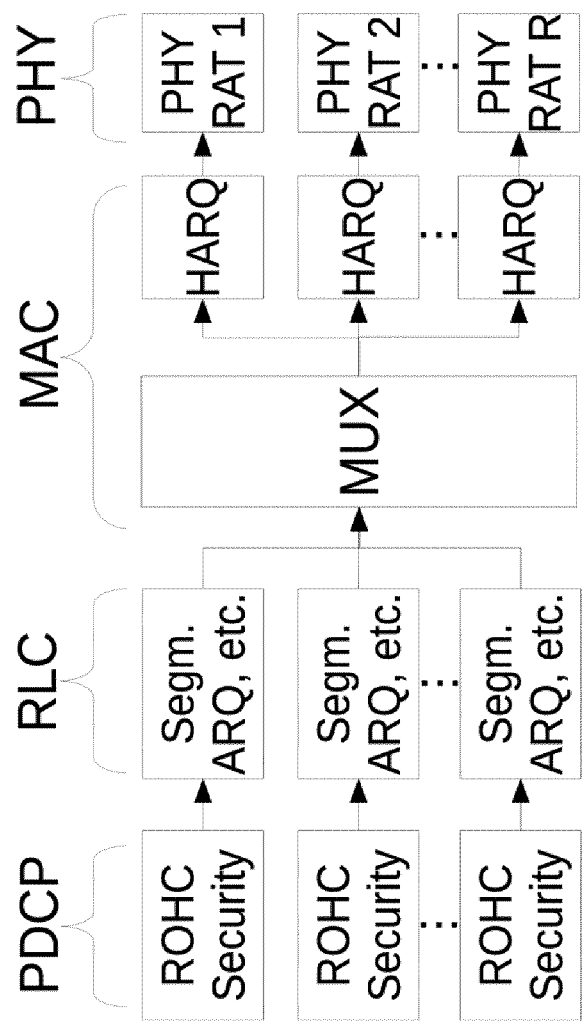
FIG. 2 is a schematic view illustrating an LTE stack with MAC layer aggregation as it can be employed in methods in accordance with embodiments of the present invention.

Although multi-connectivity can be implemented at different layers of the stack (TCP/IP, PDCP or MAC), embodiments of the present invention focus on MAC layer aggregation (as illustrated in FIG. 2 for the LTE stack) because it allows much finer granularity and it is a natural evolution of legacy Carrier Aggregation (CA)-introduced by 3GPP in LTE Release 10 specification.

According to an embodiment, a multi-RAT system is considered that is comprised of R={1, . . . , R} RATs and N={1, . . . , N} mobile users/terminals. RATs can be co-located (e.g. in a multi-RAT base station) or distributed in a C-RAN architecture (perfect information) or forming a HetNet structure (imperfect information). Without loss of generality, it can be assumed that each user/terminal is mapped to one traffic class or QoS class identifier (QCI). The extension to a general case can be done by adding virtual users. All RATs can be deactivated except one (primary RAT), in order to guarantee an available control channel at all times.

Systems and methods described herein employ a number of different RATs that are based on OFDMA. Although other waveforms are being considered for a 5G unified radio, namely 5G New Radio (NR), OFDM has a broad support and it is likely to be selected (for reference, see Qualcomm, "Exploring 5G New Radio: Use Cases, Capabilities & Timeline," White Paper, 2016). Consequently, it is possible to allocate physical resource blocks (PRBs) from a pool available at each RAT, with bandwidth that may vary over time. Further, this makes it possible to model unlicensed bands too.

According to an embodiment, each PRB is modulated with a modulation level from a discrete set $M_{r,n} = \{m_{r,n,1}, \ldots, m_{r,n,M}\}$, where $m_{r,n,M}$ is the highest, yet reliable, modulation level (using highest transmission power) that can be used in the physical link between RAT r and user/terminal n (wherein this modulation level can be computed with standard models). In this way, RATs with different properties are modelled (e.g. different range of available modulation and coding schemes, different bandwidth, etc.). Although the following description focusses on the downlink case, the proposed model also applies to the uplink case.

Systems and methods described herein employ a scheduling component that jointly assigns PRBs, modulation levels and RAT(s) to users such that the user demand is satisfied (ensuring the system is stable) while maintaining a good balance between system cost (including energy consumption) and QoS satisfaction. The scheduling component may be collocated with the network controller, where the scheduling component is implemented as part of the network controller. Alternatively, the scheduling component may be implemented as an independent functional entity separate from the network controller (though exchanging information with the network controller, e.g. receiving queue information from the network controller, as will be explained in greater detail below).

Figure 3:
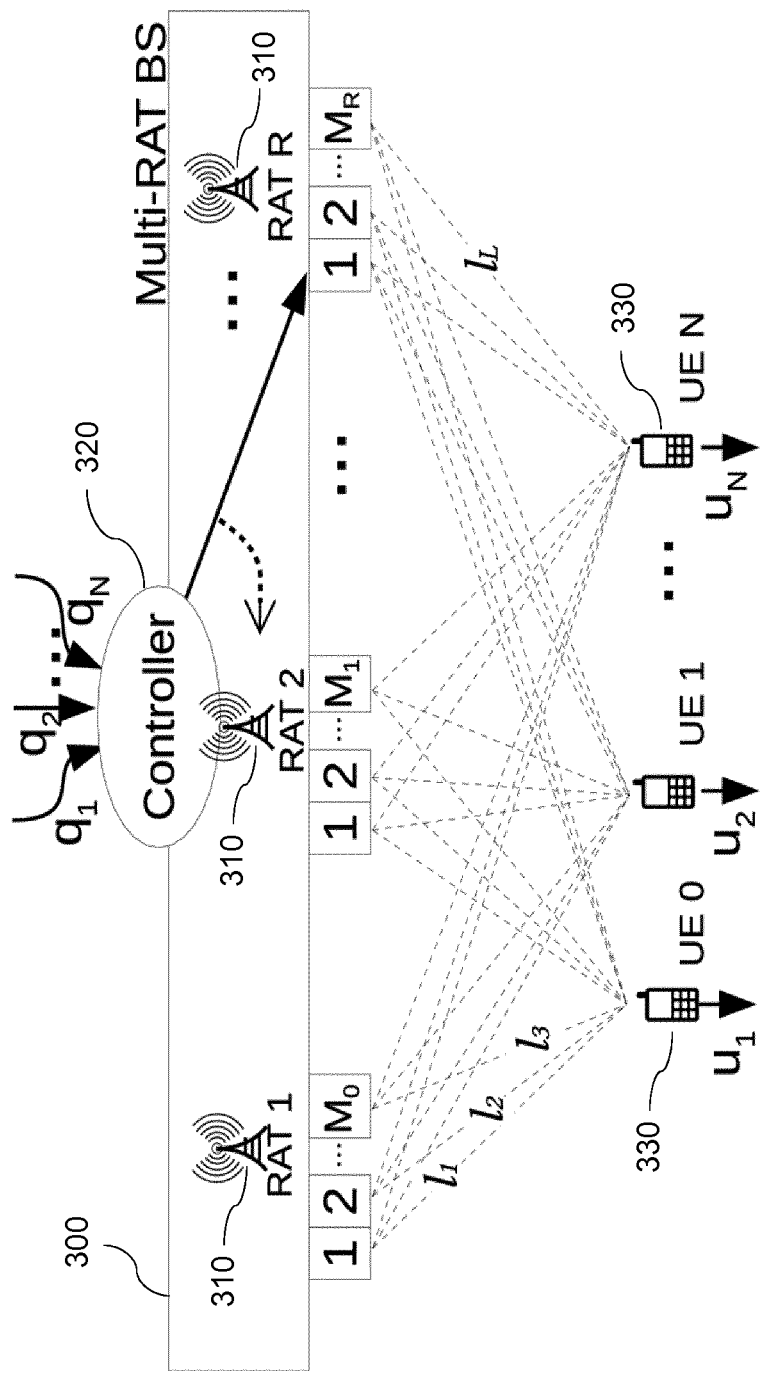
FIG. 3 is a schematic view illustrating a system for managing radio resources in a multi-RAT wireless communication network in accordance with an embodiment of the present invention.

FIG. 3 is a block diagram depicting a schematic diagram of a multi-RAT wireless communication network with radio resource management according to an embodiment of the invention. In the embodiment depicted in FIG. 3 the network includes a multi-RAT base station 300 implementing a number of heterogeneous RATs 310 (RAT 1, RAT 2, . . . , RAT R) and a network controller 320. The multi-RAT base station 300 serves a number of mobile terminals 330, denoted UE 0, UE 1, . . . , UE N in FIG. 3.

As shown in FIG. 3, the Multi-RAT Base Station 300 implements a queue $q_i$ per user i where data destined to each user is buffered. According to an embodiment, time is divided into transmission time intervals (TTIs). In each TI, the network controller 320 collects the status of all queues $q_i$ and makes the following decisions: (i) number of PRBs used in each RAT to encode data for each user i in the system; (ii) modulation and coding scheme MCS (and transmission power) of each PRB; and (iii) power state of each RAT, i.e., which RATs can be deactivated or are activated.

According to an embodiment of the invention, the network controller 320 can be configured with several features, including in particular operator preferences and/or user preferences. The operator preferences, which may be encoded as numeric weights, may include preferences regarding which RATs are favored to be deactivated. For instance, in low load regimes, an operator may prefer to turn off a cell operating in a licensed band, rather than one operating in the unlicensed spectrum. Alternatively or additionally, operator preferences may include preferences regarding the modulation levels. For instance, an operator may prefer low modulation levels, which require low transmission power, to reduce energy consumption and interference to neighboring cells. The user preferences, which may be encoded as (convex) utility functions, may consider, e.g., delay-sensitive flows vs. elastic flows, as will be described in greater detail below in connection with FIG. 7.

Figure 4:
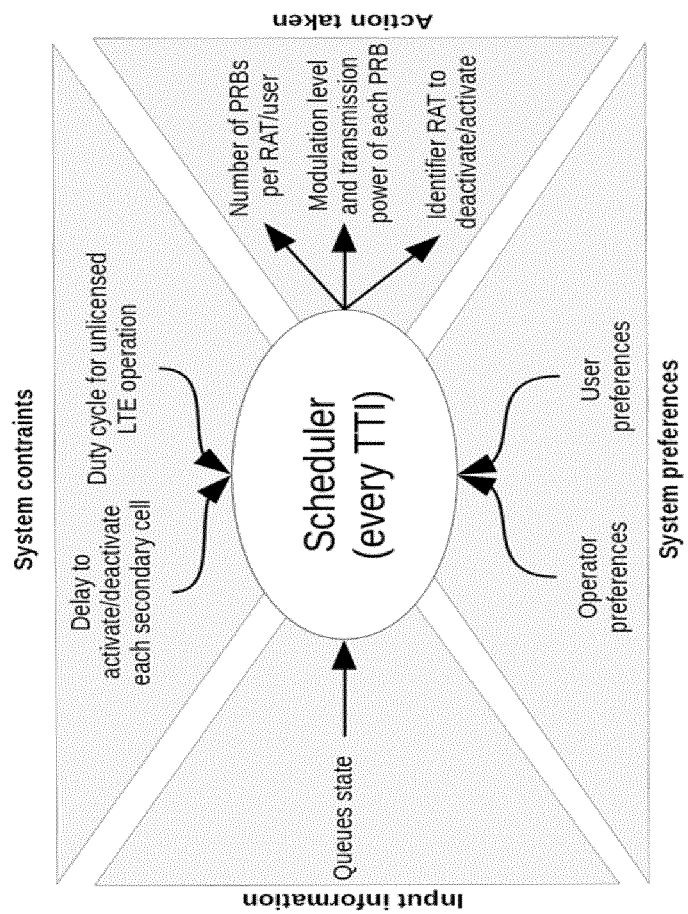
FIG. 4 is a high-level diagram of a network controller in accordance with an embodiment of the present invention.

The high-level diagram of FIG. 4 depicting an exemplary scheduling system for controlling radio resources schematically illustrates the integration of system preferences (in particular operator preferences and user preferences) into a scheduling algorithm.

Figure 5:
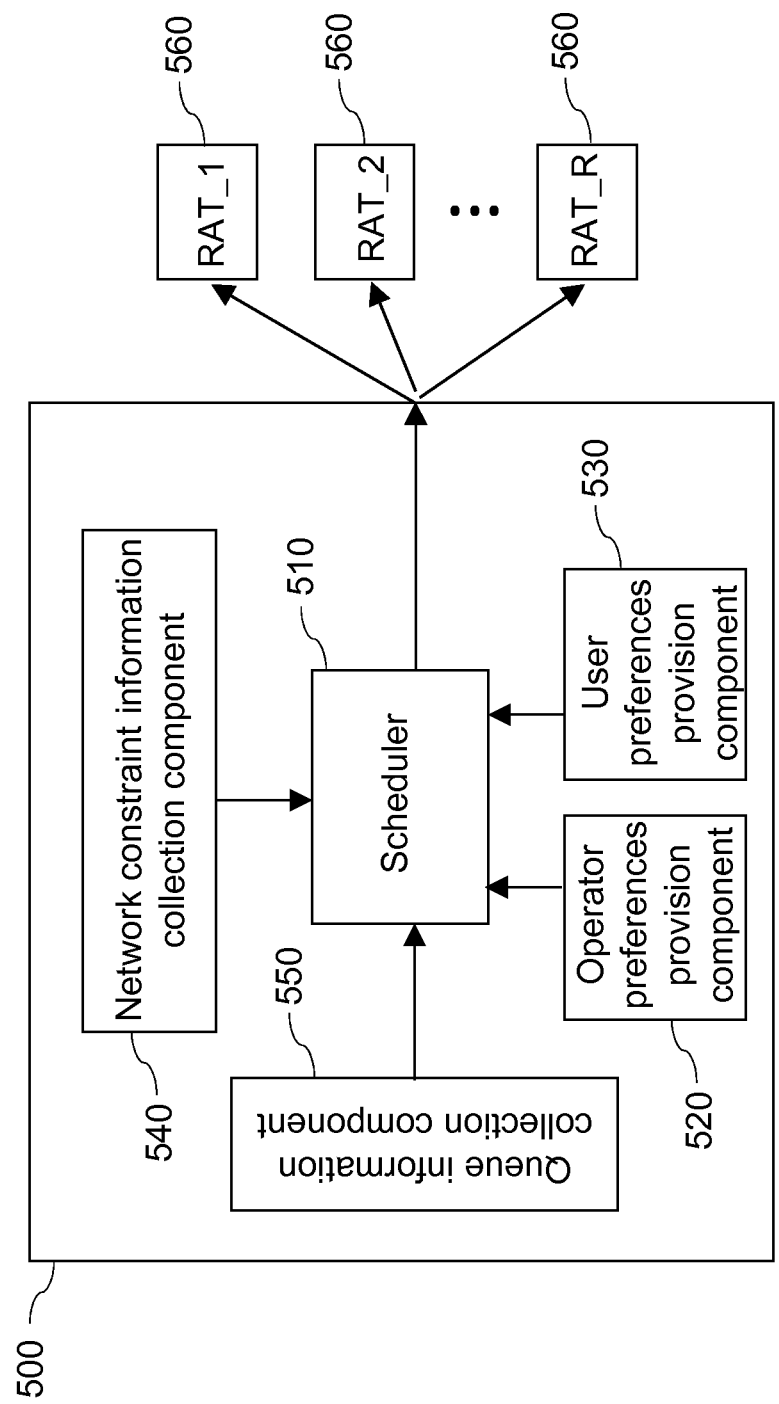
FIG. 5 is a block diagram depicting the building blocks of the network controller of FIG. 4, FIG. 6 describes a process for setting up a model of the multi-RAT system according to an embodiment of the invention, and FIG. 7 describes a process for executing a resource scheduling algorithm according to an embodiment of the invention.

A high-level description of a network controller in accordance with an embodiment of the invention is depicted in FIG. 4, while FIG. 5 is a block diagram depicting the building blocks of the network controller of FIG. 4. In FIG. 5, the network controller, which corresponds with network controller 320 of FIG. 3, is generally denoted by 500.

The high-level diagram of FIG. 4 and block diagram of FIG. 5, both depicting an exemplary scheduling system for controlling radio resources schematically illustrates the integration of system preferences into a scheduler 510 of the network controller 500. The system preferences include operator preferences, fed into the scheduler 510 by the operator preference provision component 520, and user preferences, fed into the scheduler 510 by the user preference provision component 530. Furthermore, network constraint information including, e.g., information on duty cycle for unlicensed LTE operation and/or information on the delay required to activate/deactivate each secondary cell, is fed into the scheduler 510 by the network constraint information collection component 540. It should be noted that the information can be stored or cached in a memory component at the scheduler 510 (not shown), such that the information has to be provided only once and may be updated whenever changes occur in the user/operator preferences or system constraints of the multi-RAT wireless communication network.

A major advantage of the network controller 500 according to embodiments of the invention is the ability to deactivate/activate secondary RATs when needed, importantly, taking into account the delay it takes for a secondary cell to turn on/off. In addition, according to embodiments of the invention the scheduler 510 does not take assumption on traffic distributions, i.e. it operates optimally regardless the traffic patterns and in all load regimes. It only requires instantaneous measurements of the queue states of the system. Specifically, the scheduler 510 needs queue information from all users every TI, which will be provided on a regular basis by the queue information collection component 550. As will be appreciated by those skilled in the art, in the downlink case, this information is already available. In a C-RAN deployment (whenever MAC layer is centralized) this information is also always available (both uplink/downlink). However, in non-CRAN uplink scenarios this information could be provisioned, e.g., via signaling (which is already available in LTE specification).

According to embodiments of the invention, the scheduler 510 has to perform the task of executing, a resource scheduling algorithm, based on queue information and the system constrain information. The scheduler 510 can be a processor, a processor core, or a plurality of processors and/or processor cores located at single location or distributed amongst multiple locations. Such processors or processor cores of the scheduler 510 are configured to execute processor executable instructions for executing a resource scheduling algorithm that jointly decides on the allocation of PRBs, Physical Resource Blocks, to each of the links between a RAT 560 and a mobile terminal, on the assignment of modulation levels to each of the allocated PRBs, and on the activation/deactivation of each RAT. As indicated in FIG. 5, the scheduler 510 provides its scheduling decisions to each of the RATs 560.

In the embodiment illustrated in FIG. 5, the scheduler 510 as well as the components 520, 530, 540 and 550 are implemented as part of the network controller 500. However, as mentioned earlier, the scheduler 510 as well as one or more of the components 520, 530, 540 and 550 may also be implemented as separate entities outside the network controller 500.

Hereinafter, operation of a multi-connectivity scheduler for a multi-RAT system according to an embodiment of the invention will be described in greater detail. In this context conventional notation will be used. That is, R and Z denote the set of real and integer numbers. $R_+$, $R^n$, and $R^{n \times m}$ are used to represent the sets of non-negative real numbers, n-dimensional real vectors, and m×n real matrices, respectively. Vectors are usually in column form and written in bold font. Matrices are in upper-case roman font. Subscripts represent an element in a vector and superscripts elements in a sequence. For instance, $\langle \vec{x}^{(t)} \rangle$ is a sequence of vectors with $\vec{x}^{(t)} = [x_1^{(t)}, \ldots, x_n^{(t)}]^T$ being a vector from $R^n$. In turn, $\vec{x}^{(t)}_i$ is the i'th component of the t'th vector in the sequence. Superscript T represents the transpose operator. $\vec{x} < \vec{y}$ indicates that $x_i < y_i$, $\forall i$. Finally, $[\bullet]^+$ denotes the projection of a vector onto the non-negative orthant, i.e., $[x]^+ = [\max\{0, x_1\}, \ldots, \max\{0, x_n\}]$, $x \in R^n$.

Figure 6:
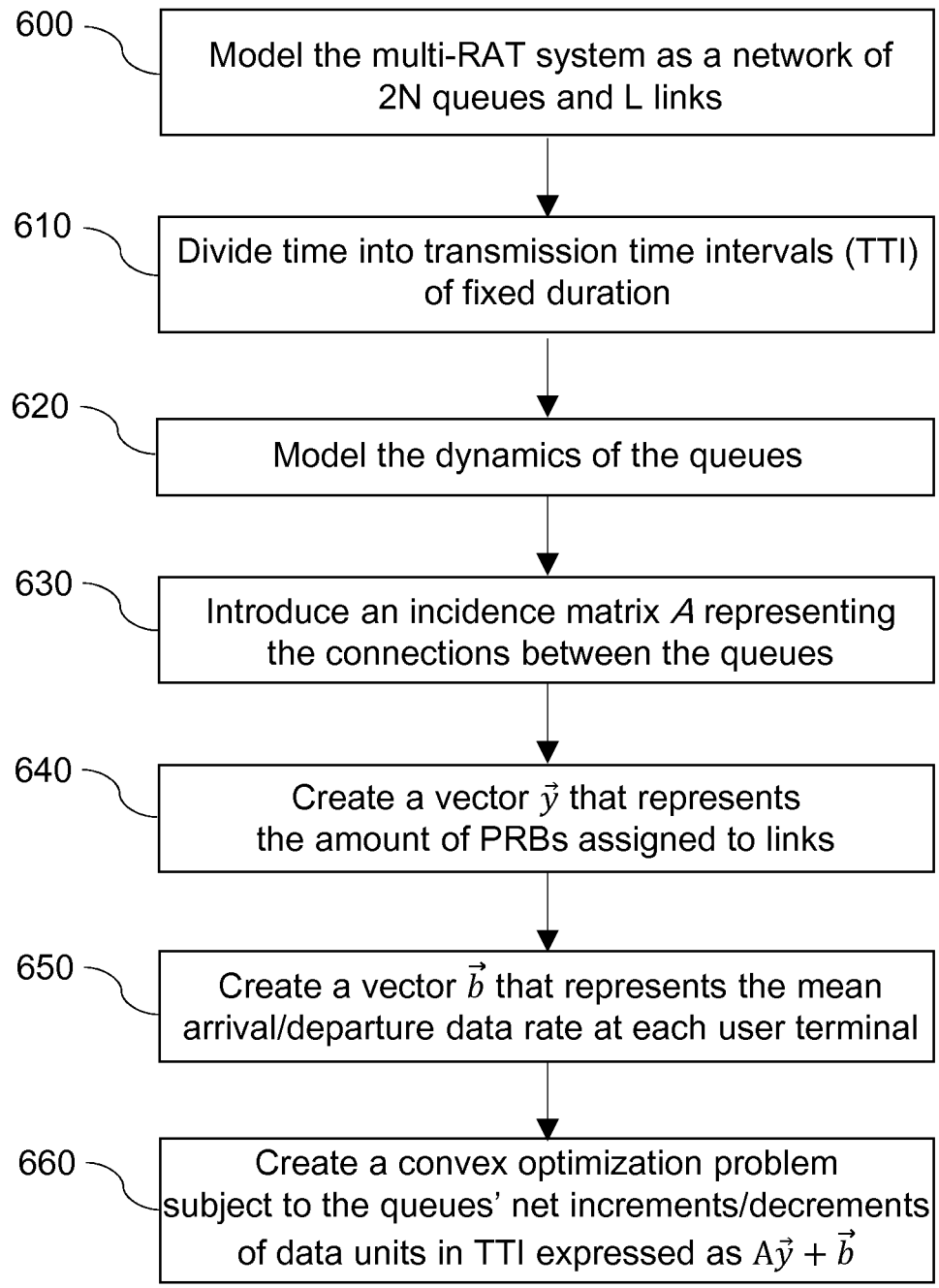

FIG. 6 is a flow chart depicting a process for establishing a convex optimization approach for the scheduling problem according to an embodiment of the invention. At 600, the multi-RAT system is modeled as a network of 2N queues $\{q_n, u_n | \forall n \in N\}$ (an incoming queue $q_n$ and outgoing queue $u_n$ per flow n) and $L = \Sigma_{n \in N} \Sigma_{r \in R} |M_{r,n}|$ links, i.e. different ways of transmitting data between RATs and users (as illustrated in FIG. 3). At 610, time is divided into transmission time intervals (ITI) of fixed duration t=1, 2, . . . and, at 620, the dynamics of the queues is modelled as $$\vec{Q}^{(t+1)} = [\vec{Q}^{(t)} + \vec{\delta}^{(t)}]^+, t=1, 2, \ldots$$

where $\vec{Q}^{(t)} \in Z_+^{2N}$ is a column vector bookkeeping the state of all queues in the system at TTI t, i.e. $\vec{Q}^{(t)} = [q_1^{(t)}, q_2^{(t)} \ldots u_1^{(t)}, u_2^{(t)} \ldots]^T$ and $\vec{\delta}^{(t)} \in Z^{2N}$ is a column vector containing the queues net increments/decrements of data units in TTI t. At 630, an incidence matrix $A \in Z^{2N \times L}$ is introduced that represents the connections between queues, so that element $A_{i,j}$ represents the amount of data units per PRB departing from (if negative) or arriving to (if positive) queue i when using link j. Here, it should be noted that the amount of bits transported on each PRB depends on the modulation scheme used in link j at one TTI.

For better understanding, the above is illustrated with a simple example with 2 mobile users, 2 RATs and 2 modulation indexes available for each RAT and user. In such case, there are L=8 links connecting the multi-RAT system with the mobile users, and 4 queues (an incoming and an outgoing queue per user). Thus, $$A = \begin{matrix} & & l_1 & l_2 & l_3 & l_4 & l_5 & l_6 & l_7 & l_8 \\ Q_1(q_1) & & (m_{1,1,1}) & (m_{1,1,2}) & (m_{2,1,1}) & (m_{2,1,2}) & (m_{1,2,1}) & (m_{1,2,2}) & (m_{2,2,1}) & (m_{2,2,2}) \\ & & -1 & -2 & -10 & -20 & 0 & 0 & 0 & 0 \\ Q_2(q_2) & & 0 & 0 & 0 & 0 & -1 & -2 & -10 & -20 \\ Q_3(u_1) & & 1 & 2 & 10 & 20 & 0 & 0 & 0 & 0 \\ Q_4(u_2) & & 0 & 0 & 0 & 0 & 1 & 2 & 10 & 20 \end{matrix}.$$

The above means that RAT 1 transmits 1 data unit per PRB allocated when using modulation $m_{1,1,1}$ and $m_{1,2,1}$, i.e. using link $l_1$ ($q_1 \rightarrow u_1$) and link $l_5$ ($q_2 \rightarrow u_2$), and 2 data units per PRB when using $m_{1,1,2}$ and $m_{1,2,2}$ (links $l_2$ and $l_6$). On the other hand, RAT 2 transmits 10 and 20 data units per PRB when using modulation $m_{2,1,1}$ and $m_{2,2,1}$, and $m_{2,1,2}$ $m_{2,2,2}$, respectively.

According to an embodiment, the system works as follows: Data arrives randomly at each queue $q_i$ and TTI t. At the same time, in each TTI, the controller makes a scheduling decision and so it assigns a number of PRBs to each link, that is, selecting a modulation index and a RAT for each PRB. Precisely, indicated at 640, it selects a vector $\vec{y} \in Y \subseteq Z_+^L$ where the (integer) i'th element of the vector indicates the amount of PRBs assigned to link i in that TTI. Hence, at each TTI there is the update $$\vec{Q}^{(t+1)} = [\vec{Q}^{(t)} + A\vec{y}^{(t)} + \vec{B}^{(t)}]^+,$$

where $A\vec{y}^{(t)}$ captures the dynamics caused by the controller's decisions and $\vec{B}^{(t)} \in Z^{2N}$ are the net increments of data units that enter/leave the system (see at 650). In the simple example, $y^{(t)} = [5,0,0,1,0,10,0,20]^T$ causes the following updates $$Q_1^{(t+1)} = [Q_1^{(t)} - 25 + B_0^{(t)}]^+$$

$$Q_2^{(t+1)} = [Q_2^{(t)} - 420 + B_1^{(t)}]^+$$

$$Q_3^{(t+1)} = [Q_3^{(t)} + 25]^+$$

$$Q_4^{(t+1)} = [Q_4^{(t)} + 420]^+.$$

In addition, the scheduler decides on each TTI which RATs are to be activated/deactivated. Implementation of the scheduler will consider the amount it takes for a secondary RAT to turn on/off, i.e., the scheduler will not assign PRBs on a RAT that is turning on and thus, differently to prior art, it is not assumed that turning on/off RATs is instantaneous.

In addition, the MAC scheduler do not assign PRBs to RATs which are in an off cycle due to e.g. coexistence operation in unlicensed spectrum.

Based on the above, at 660, a convex model of the scheduling problem is introduced. Later, it will be shown how queues and discrete scheduling decisions can be included when solving the Lagrange dual problem. Consider the following optimization problem:

Problem 1

$$\underset{\vec{x} \in X}{\text{minimize}} \; f(\vec{x}) \quad (1)$$

$$\text{subject to } A\vec{x} + \vec{b} < 0 \quad (2)$$

where $f: X \rightarrow R$, A is an incidence matrix as described above, $\vec{b} \in R^{2N}$, and X is a convex subset from conv(Y) where Y is the set of all possible actions. That is, a vector $\vec{x} \in X \subseteq (Y)$ indicates the fraction of time each link is scheduled with data, and $f(\vec{x})$ is a cost derived from that allocation. $\vec{b}$ represents the (unknown) mean arrival/departure data rate at each node. Making the usual assumption that $X^* := \{\arg \min_{\vec{x} \in X} f(\vec{x}) | A\vec{x} + \vec{b} < 0\}$ is nonempty, and so the above problem is feasible.

In order to solve the Problem 1 efficiently, it is essential to (i) ensure that objective function selected is convex (and so Problem 1); but also (ii) that the algorithm used does not require perfect knowledge of $\vec{b}$. The first point is important because then it is possible to use standard convex optimization methods, while the second one is because, resource demand is hard to predict (if possible at all) in dense multi-RAT systems. These two points will be addressed in more detail below.

Figure 7:
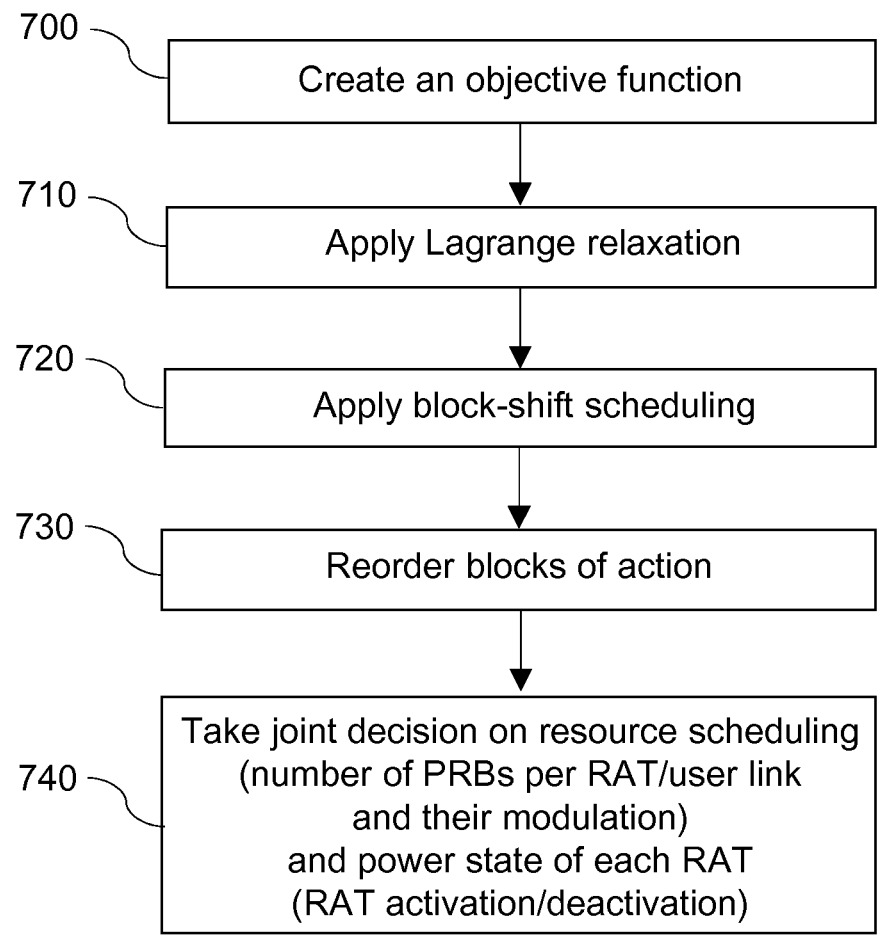

FIG. 7 is a flow chart depicting a process for executing a resource scheduling algorithm according to an embodiment of the invention. Based on the above model, at 700, the objective function is designed. In this context it will be considered that each flow i has a different utility $U_i(\rho_i)$ where $\rho_i$ is the i'th element of $\rho := A\vec{x} = [\rho_1, \ldots, \rho_{2N}]^T$. Specifically, three different types of utility may be considered.

The first one is $$U_i(\vec{x}) = g_i(\rho) := \frac{1 + e^{a_i b_i}}{e^{a_i b_i}} \left( \frac{1}{1 + e^{-a_i(\rho - b_i)}} - \frac{1}{1 + e^{a_i b_i}} \right), \quad (3)$$

a normalized sigmoidal-like function for delay-sensitive flows, where $a_i$ and $b_i$ are parameters. For example, when $a_i \approx b_i \approx \rho$ this function is a good approximation to a step function for voice traffic with rate requirement $\rho$; and when $a_i = \rho = b_i$ it can be used to model the utility of adaptive real-time applications with mean rate $\rho$.

The second utility function that may be considered is $$U_i(\vec{x}) = h_i(\rho) := \frac{\log(1 + c_i \cdot \rho)}{\log(1 + c_i \cdot \hat{\rho})}, \quad (4)$$

which is useful for elastic (delay-tolerant) flows. $\hat{\rho}_i$ is the maximum aggregated throughput achievable in the system, and $c_i$ is the satisfaction growth rate per $\rho$ allocated.

Finally, it may also be considered $$U_i(\vec{x}) = 0, \quad (5)$$

which captures the case where flows do not require QoS guarantees.

In addition, it is intended to give operators flexibility in the way their infrastructure is utilized. For instance, an operator may want to aggregate system load into the minimum possible subset of RATs in order to save costs. According to an embodiment, this can be done by assigning a weight $w_{r,m}$ on each PRB allocated in RAT r when modulated with index m. The resulting objective function is the following:

$$f(\vec{x}) = \eta \vec{w}^T \vec{x} - \frac{1}{N} \sum_{i=1}^{N} \log(U_i(\vec{x})) \quad (6)$$

where $\eta \geq 0$ is a constant that controls the relative importance of system cost reduction against overall utility satisfaction. That is, for a given $\eta$, a solution $\vec{x}^*$ to Problem 1 corresponds to a point in the Pareto optimal trade-off between utility satisfaction and cost minimization. For example, by setting $\eta = 0$ the objective function would only consider QoS satisfaction irrespective of how the infrastructure is used. Convexity of the objective function has been proved.

Next, at 710, in order to relax the perfect knowledge of the system constraints, Lagrange relaxation will be applied. In short, Lagrange relaxation allows to formulate the dual problem, with which a sequence of primal variables $\langle \vec{x}^{(t)} \rangle$ can be generated that converges to the optimum or a point nearby without requiring to be feasible in each iteration. This is in marked contrast to other iterative methods, such as interior point or projected gradient, and so provides flexibility as to how to select a sequence of actions or gradients. This will be clear shortly, but first the Lagrange dual problem of Problem 1 is considered and introduced as follows:

Problem 2

$$\text{maximize } q(\vec{\lambda}) \quad (7)$$
$$\vec{\lambda} \geq 0$$

where $q(\vec{\lambda}) := \inf_{\vec{x} \in X} L(\vec{x}, \vec{\lambda})$ with $L(\vec{x}, \vec{\lambda}) = f(\vec{x}) + \vec{\lambda}^T (A\vec{x} + \vec{b})$.

It is noted that solving Problem 2 is equivalent to solving Problem 1 when strong duality holds (which is always the case when the Slater condition is satisfied, i.e., there exists a point $\vec{x} \in X$ such that $A\vec{x} + \vec{B} < 0$). Further, it is noted that $q(\vec{\lambda})$ is concave (cf. S. Boyd and L. Vanderberghe, *Convex Optimization*, New York, N.Y., USA: Cambridge University Press, 2004). Hence, $q(\vec{\lambda})$ can be maximized using the standard (sub)gradient ascent method with constant step size, i.e., with update $$\vec{\lambda}^{(t+1)} = [\vec{\lambda}^{(t)} + \alpha(A\vec{x}^{(t)} + \vec{b})]^+, \quad (8)$$

where $\vec{x}^{(t)} \in \arg\min_{\vec{x} \in X} L(\vec{x}, \vec{\lambda}^{(t)})$ and $\alpha > 0$. Now, observe that update (8) has a queue-like form, and that if $\vec{b}$ is replaced by a random variable $\vec{B}^{(t)}$, and $\vec{x}^{(t)}$ by $\vec{y}^{(t)}$ one can write $$\vec{\mu}^{(t+1)} = [\vec{\mu}^{(t)} + \alpha(A\vec{y}^{(t)} + \vec{B}^{(t)})]^+. \quad (9)$$

with $\vec{\lambda}^{(1)} = \vec{\mu}^{(1)}$. Further, if $\vec{\mu}^{(t)}$ is divided by $\alpha$ one has $$\vec{Q}^{(t+1)} = [\vec{Q}^{(t)} + i\, A\vec{y}^{(t)} + \vec{B}^{(t)})]^+ = [\vec{Q}^{(t)} + \vec{\delta}^{(t)}]^+. \quad (10)$$

yielding the queue updates as given above. As shown by V. Valls et al. (V. Valls and D. J. Leith, *A Convex Optimization Approach to Discrete Optimal Control*, https://arxiv.org/abs/1701.0241, 2017), by ensuring that the difference $\|\vec{\lambda}^{(t)} - \vec{\mu}^{(t)}\|_2 = \|\vec{\lambda}^{(t)} - \alpha \vec{Q}^{(t)}\|_2$ is uniformly bounded, one will have that the scaled queue occupancies "behave" like Lagrange multipliers and so the sequence of discrete actions $\langle \vec{y}^{(t)} \rangle$ will be optimal. For this to hold, however, it is required that (i) $\vec{B}^{(t)}$ is an i.i.d. stochastic process with finite variance and mean $\vec{b}$ $$\left(\text{i.e., } \lim_{t \to \infty} \frac{1}{t} \sum_{i=1}^{t} \vec{B}^{(t)} = \vec{b}\right),$$

and (ii) the difference $\|\Sigma_{i=1}^{t} \vec{x}^{(t)} - \vec{y}^{(t)}\|_2$ is uniformly bounded.

Systems and methods described herein employ an algorithm to select optimal sequences of discrete actions. The purpose is twofold: (i) to obtain discrete solutions that preserve convergence and stability; and (ii) to include restrictions in the order in which actions are taken (e.g. to account for delays when RATs are being switched on/off). As noted earlier, the first objective is met as long as discrete sequences $\langle \vec{y}^{(t)} \rangle$ are built such that $\|\Sigma_{i=1}^{t} \vec{x}^{(t)} - \vec{y}^{(t)}\|_2$ remains uniformly bounded. Moreover, V. Valls et al. (V. Valls and D. J. Leith, *A Convex Optimization Approach to Discrete Optimal Control*, 2017) show that shifted and/or reordered sequences do not affect that boundedness. This flexibility can be exploited to accommodate system constraints.

According to an embodiment, at 720, a block-shift scheduling algorithm is executed. Specifically, the above may be conveyed in Algorithm 1, as shown below:

---
Algorithm 1 Block-shift scheduling

1: $Y_c \in \mathbb{N}^{L \times \tau}$
2: $Y_s \in \mathbb{N}^{L \times \tau}$
3: $\tau \in \mathbb{N}$
4: $Y_s \leftarrow 0$ -continued Algorithm 1 Block-shift scheduling 5: for each TTI t do
6:   $y_c \in \arg\min_{y \in W} \|x^{(t)} - y\|_2$
7:   $Y_c[t \bmod \tau] \leftarrow y_c$
8:   if t mod τ == 0 then
9:     $Y_s \leftarrow$ Reorder($Y_c$, τ)
10:  $y^{(t)} \leftarrow Y_s[t \bmod \tau]$ As noted earlier, reordering blocks of actions allows to take into account different system constraints. Embodiments of the present invention use this feature, at 730, to consider the (de)activation delay of RATs, i.e., the time it takes for a RAT to be fully operative after it has been turned off and vice versa. In particular, it will be ensured that no resources are scheduled while RATs or modulations are not available.

An embodiment of the reordering algorithm is depicted below in Algorithm 2:

Algorithm 2 Actions Reordering

1: function REORDER($Y_c$, τ)
2:   $D \in (0, 1)^{L \times \tau}$        ▷ Link availability information
3:   $S \leftarrow \emptyset$
4:   for each k = {1, ..., τ} do
5:     $Z_s \leftarrow Y_c^T \cdot D[k]$
6:     $i \in \arg\min_{s \in \{1,2,...\tau\} \setminus S} Z_s$
7:     $Y_s[k] \leftarrow Y_c[i] \cdot (!D[k])$        ▷ ! is the logical negation
8:     $S \leftarrow S \cup i$
9:   return $Y_s$ Let $W := [\vec{y}_1, \ldots, \vec{y}_{|Y|}]$ denote a matrix that collects all points in Y. Then, in step 6, Algorithm 1 finds for every TTI t, the vector of integer values $\vec{y}_c$ closest to $\vec{x}^{(t)}$ (computed using the convex optimization approach explained earlier), ensuring in this way that the euclidean distance $\|\Sigma_{i=1}^t \vec{x}^{(i)} - \vec{y}^{(i)}\|_2$ is uniformly bounded. It should be noted here that, differently, V. Valls et al. (in their document cited above) propose to use convex optimization to minimize the distance between $\vec{x}$ and a convex hull of $|Y|$-dimensional standard basis vectors. However, in the present case the dimensionality of W can be very large and so this approach renders impractical for real-time operation. In contrast, embodiments exploit the fact that $\vec{y}$ is any positive integer point contained in $Z_+^L$ and rounding is therefore sufficient to ensure boundedness.

The above enables to select sequences of discrete actions that guarantee convergence and stability, but they do not necessarily satisfy system constraints. As an example, an action $y^{(t)}$ may allow turning off a RAT. Hence, in such case, it must be ensured that subsequent actions do not use the deactivated RAT for, at least, the number of ITIs that it takes for the RAT to turn back on again. It was mentioned above that delayed or shifted sequences do not affect the boundedness of $\|\Sigma_{i=1}^t \vec{x}^{(i)} - \vec{y}^{(i)}\|_2$. Hence, in order to accommodate practical constraints of the system, a block-shift approach may be employed. According to an embodiment the block-shift approach bundles τ discrete actions in a block of solutions from W that are reordered so that system constraints are met, and that are applied in the next τ slots (i.e. the sequence is shifted). To this aim, in Algorithm 1, $Y_c$, $Y_s$ $\in N^{L \times \tau}$ denote two matrices that store the current and shifted sequences, respectively. For convenience of notation, X[i] is used to refer to the column vector i of matrix X. Now, every τ TTI intervals, sequences stored in $Y_c$ are reordered (step 9) and one obtains a new block of actions $Y_s$ for the next τ intervals. The sorting process will be described in greater detail below.

Algorithm 2 takes as input parameters the matrices of current actions, $Y_c$, and the duration of a block, τ, and returns the actions reordered in matrix $Y_s$. The algorithm makes use of an auxiliary Boolean matrix $D \in \{0,1\}^{L \times \tau}$ in which each element $D_{i,j}$ takes value 1 if link i is not available at TTI j, and 0 otherwise. In this way, D allows to keep track of links that are unavailable at some TTI within the block because, e.g., a RAT is turning on and so it is not yet operational, a RAT is not available due to an off duty cycle (e.g. in unlicensed operation), some modulation level is not reliable for that TTI due to fading, etc.

In addition, the algorithm uses set S to store the indexes of those actions that have been included already in $Y_s$. Now, for each interval t of the τ-block, the algorithm selects those actions from $Y_c$ that assign minimal (none) PRBs to links that are set to 1 in D[t](unavailable) as indicated in steps 5-6 of Algorithm 2. If unavailable links still have some assignment, the algorithm clears this issue in step 7, stores the result in $Y_s$, and iterates until the block is finished up and no actions remain unassigned. In this context it should be noted that If τ is not sufficiently large, the sequence of actions in $Y_c$ may not contain solutions that satisfy all constraints in some interval t. In this case, the algorithm selects the action that better accommodates them and modifies it accordingly. Although stability guarantees are lost by doing this, simulations reveal that it is a good approximation in all scenarios of interest. Note however that a sufficiently large τ mitigates this issue.

Finally, at 740, the scheduler takes a joint decision on resource scheduling (i.e. the number of PRBs per RAT/user link and their modulation) and on the power state of each RAT (i.e. RAT activation/deactivation). Hence, the scheduler dynamically turns on/off secondary RATs during the operation time from a common MAC perspective. This maximizes the amount of time secondary RATs are turned off or in sleep mode and, consequently, operational cost, energy consumption and inter-cell interference in the system will be reduced. To do so, in contrast to prior art solutions, the proposed approach exploits the connection between queue states and Lagrange multipliers to make optimal decisions.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for managing radio resources in a multiple radio access technology (multi-RAT) wireless communication network including one or more orthogonal frequency-division multiple access (OFDMA)-based base stations that implement different radio access technologies (RATs), the method comprising:
   creating, for each of a plurality of mobile terminals, an incoming queue where data destined to the respective mobile terminal is buffered,
   collecting queue information of each of the mobile terminals and providing the queue information to the multi-RAT wireless communication network,
   defining system constraints of the multi-RAT wireless communication network and providing network constraint information, and
   based on the queue information and the network constraint information, executing a resource scheduling algorithm that jointly determines:
      an allocation of physical resource blocks (PRBs) to each link between one of the RATs and one of the mobile terminals,
      an assignment of modulation levels to each of the allocated PRBs, and
      an activation/deactivation of each of the RATs,
   wherein mobile user preferences are used as input parameters for the resource scheduling algorithm by encoding the mobile user preferences as utility functions into an objective function $f(\vec{x})$.

2. The method according to claim 1, wherein the steps of collecting the queue information and providing the queue information and of executing the resource scheduling algorithm are repeated in regular time intervals.

3. The method according to claim 1, wherein the network constraint information includes duty cycle information in unlicensed bands, energy consumption information, modulation and coding scheme (MCS), tables, and/or information on a delay it takes for a particular one of the RATs to activate/deactivate.

4. The method according to claim 1, wherein the executing the resource scheduling algorithm comprises:
   creating an incidence matrix denoted A that represents the connections between the queues, wherein an element denoted $A_{i,j}$ of the matrix A represents the amount of data units per PRB departing from or arriving to a queue denoted i when using a physical link denoted j between one of the RATs and one of the mobile terminals.

5. The method according to claim 4, wherein the executing the resource scheduling algorithm further comprises:
   creating a convex scheduling problem that minimizes an objective function denoted $f(\vec{x})$, subject to $A\vec{x} + \vec{b} \leq 0$, wherein x is a vector that indicates the fraction of time each of the links is scheduled with data, $f(\vec{x})$ denotes a cost derived from that allocation, and $\vec{b}$ represents the mean arrival/departure data rate at each of the mobile terminals.

6. The method according to claim 1, further comprising:
   defining network operator preferences and using the network operator preferences as input parameters for the resource scheduling algorithm, preferably by encoding the network operator preferences as numeric weights into an objective function $f(\vec{x})$.

7. The method according to claim 5, wherein the executing the resource scheduling algorithm comprises:
   introducing the dual problem of the convex scheduling problem by applying Lagrange relaxation.

8. The method according to claim 1, wherein the executing the resource scheduling algorithm comprises:
   selecting optimal sequences of discrete scheduling actions by applying block-shift scheduling.

9. The method according to claim 8, wherein the executing resource scheduling algorithm comprises:
   reordering blocks of scheduling actions such that scheduling actions comply with the network constraints.

10. The method according to claim 1, wherein the utility functions include at least one function adapted to capture delay sensitive flows having a given rate requirement.

11. The method according to claim 1, wherein the utility functions include at least one function adapted to capture flows having a given delay tolerance.

12. The method according to claim 1, wherein the utility functions include at least one function adapted to capture flows that do not require any quality of service (QoS) guarantees.

13. A tangible, non-transitory computer readable media having stored thereon instructions for managing radio resources in a multiple radio access technology (multi-RAT) wireless communication network that includes one or more orthogonal frequency-division multiple access (OFDMA)- based base stations that implement different radio access technologies (RATs), which, upon execution by memory and one or more processors, alone or in combination, provide for execution of a method comprising:
  creating for each of a plurality of mobile terminals an incoming queue where data destined to the respective mobile user is buffered,
  collecting queue information of each of the mobile terminals,
  creating network constraint information based on system constraints of the multi-RAT wireless communication network, and
  based on the queue information and the network constraint information, scheduling resources by jointly determining:
    an allocation of physical resource blocks (PRBs) between each link between one of the RATs and one of the mobile terminals,
    an assignment of modulation levels to each of the allocated PRBs, and
    an activation/deactivation of each of the RATs,
  wherein mobile user preferences are used as input parameters for the resource scheduling algorithm by encoding the mobile user preferences as utility functions into an objective function $f(\vec{x})$.

14. A controller for managing radio resources in a multiple radio access technology (multi-RAT) wireless communication network including one or more orthogonal frequency-division multiple access (OFDMA)-based base stations that implement different radio access technologies (RATs), the controller comprising:
  one or more processors configured to:
    create for each of a plurality of mobile terminals an incoming queue where data destined to the respective mobile terminal is buffered,
    collect queue information of each of the mobile terminals,
    create network constraint information based on system constraints of the multi-RAT wireless communication network, and
    based on the queue information and the network constraint information, schedule resources by jointly determining:
      an allocation of physical resource blocks (PRBs) to each link between one of the RATs and one of the mobile terminals,
      an assignment of modulation levels to each of the allocated PRBs, and
      an activation/deactivation of each of the RATs,
    wherein mobile user preferences are used as input parameters for the resource scheduling algorithm by encoding the mobile user preferences as utility functions into an objective function $f(\vec{x})$.

15. The method according to claim 2, wherein the steps of collecting the queue information and providing the queue information and of executing the resource scheduling algorithm are repeated every transmission time interval (TTI).

16. A method for managing radio resources in a multiple radio access technology (multi-RAT) wireless communication network including one or more orthogonal frequency-division multiple access (OFDMA)-based base stations that implement different radio access technologies (RATs), the method comprising:
  creating, for each of a plurality of mobile terminals, an incoming queue where data destined to the respective mobile terminal is buffered,
  collecting queue information of each of the mobile terminals and providing the queue information to the multi-RAT wireless communication network,
  defining system constraints of the multi-RAT wireless communication network and providing network constraint information,
  based on the queue information and the network constraint information, executing a resource scheduling algorithm that jointly determines:
    an allocation of physical resource blocks (PRBs) to each link between one of the RATs and one of the mobile terminals,
    an assignment of modulation levels to each of the allocated PRBs, and
    an activation/deactivation of each of the RATs
  wherein the executing the resource scheduling algorithm comprises:
    creating an incidence matrix denoted A that represents the connections between the queues, wherein an element denoted $A_{i,j}$ of the matrix A represents the amount of data units per PRB departing from or arriving to a queue denoted i when using a physical link denoted j between one of the RATs and one of the mobile terminals.

17. A method for managing radio resources in a multiple radio access technology (multi-RAT) wireless communication network including one or more orthogonal frequency-division multiple access (OFDMA)-based base stations that implement different radio access technologies (RATs), the method comprising:
  creating, for each of a plurality of mobile terminals, an incoming queue where data destined to the respective mobile terminal is buffered,
  collecting queue information of each of the mobile terminals and providing the queue information to the multi-RAT wireless communication network,
  defining system constraints of the multi-RAT wireless communication network and providing network constraint information,
  based on the queue information and the network constraint information, executing a resource scheduling algorithm that jointly determines:
    an allocation of physical resource blocks (PRBs) to each link between one of the RATs and one of the mobile terminals,
    an assignment of modulation levels to each of the allocated PRBs, and
    an activation/deactivation of each of the RATs, and
  defining network operator preferences and using the network operator preferences as input parameters for the resource scheduling algorithm, preferably by encoding the network operator preferences as numeric weights into an objective function $f(\vec{x})$.

18. A method for managing radio resources in a multiple radio access technology (multi-RAT) wireless communication network including one or more orthogonal frequency-division multiple access (OFDMA)-based base stations that implement different radio access technologies (RATs), the method comprising:
  creating, for each of a plurality of mobile terminals, an incoming queue where data destined to the respective mobile terminal is buffered,
  collecting queue information of each of the mobile terminals and providing the queue information to the multi-RAT wireless communication network, defining system constraints of the multi-RAT wireless communication network and providing network constraint information, based on the queue information and the network constraint information, executing a resource scheduling algorithm that jointly determines:
   an allocation of physical resource blocks (PRBs) to each link between one of the RATs and one of the mobile terminals,
   an assignment of modulation levels to each of the allocated PRBs, and
   an activation/deactivation of each of the RATs wherein the executing the resource scheduling algorithm comprises:
   selecting optimal sequences of discrete scheduling actions by applying block-shift scheduling.

* * * * *